July 7, 1925.
J. W. LEDEBOER
1,544,843
ARTIFICIAL STONE PRODUCT AND PROCESS
Original Filed Jan. 17, 1922
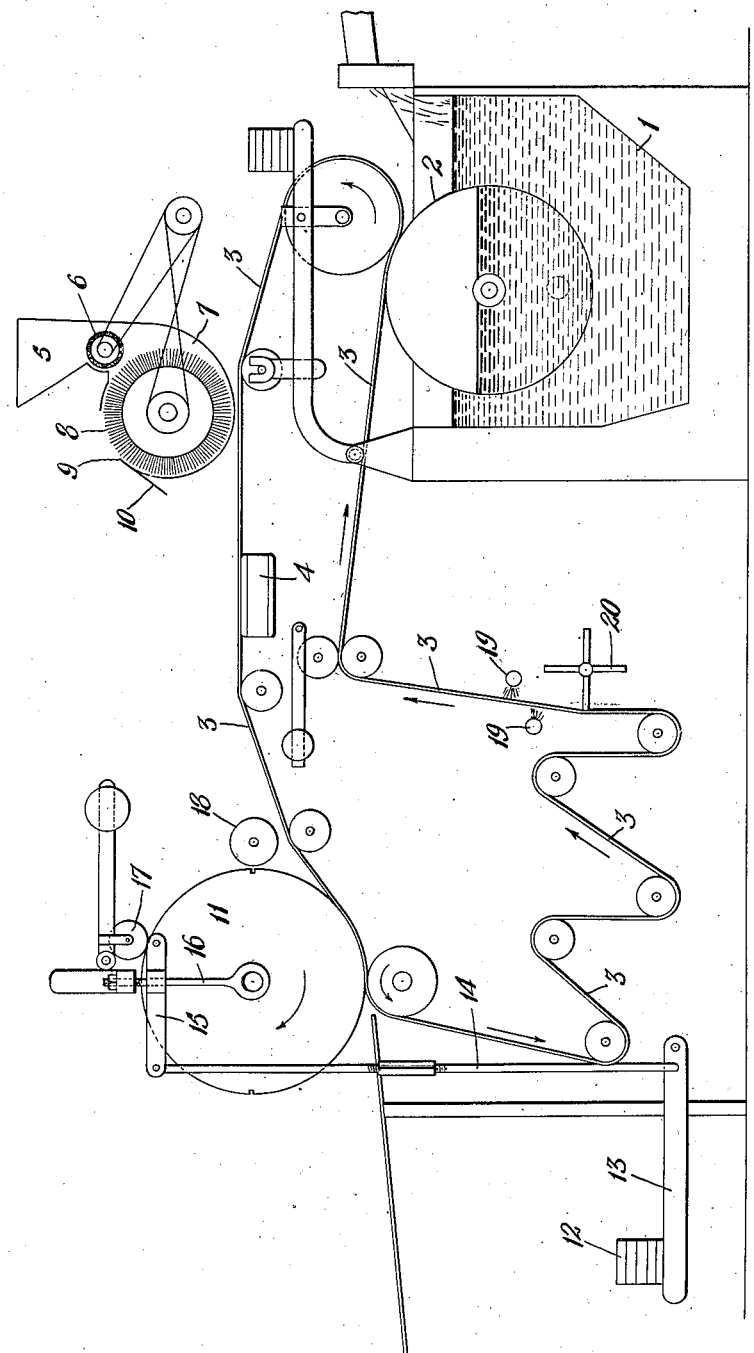
INVENTOR
John W. Ledeboer
BY Edwards, Sager & Bower
ATTORNEYS.

Patented July 7, 1925.

1,544,843

UNITED STATES PATENT OFFICE.

JOHN W. LEDEBOER, OF AMBLER, PENNSYLVANIA, ASSIGNOR TO ASBESTOS SHINGLE, SLATE & SHEATHING COMPANY, A CORPORATION, OF PENNSYLVANIA.

ARTIFICIAL-STONE PRODUCT AND PROCESS.

Application filed January 17, 1922, Serial No. 529,989. Renewed January 23, 1925.

*To all whom it may concern:*

Be it known that I, JOHN W. LEDEBOER, a citizen of the United States, residing at Ambler, in the county of Montgomery and State of Pennsylvania, have invented certain new and useful Improvements in Artificial-Stone Products and Processes, of which the following is a specification.

This invention relates to artificial stone products, and its object is to provide a composition of hydraulic cement base which shall possess a maximum of strength and durability and at the same time be convenient and economical to manufacture.

In products of this character the hydraulic cement is first worked up with a large quantity of water and with a small proportion, say about 15% to 25% of the weight of the cement, of fibrous material such as asbestos fibre, until the cement has assumed a stickly, gluelike, or "colloidal" condition and has become thoroughly entangled by the fibres. The mixture is then worked up upon a paper making machine into sheets and subjected to pressure before the cement sets. Various attempts have been made to reduce the cost of the material by reducing the proportion of hydraulic cement and substituting therefor some inert filling material of lower cost, but so far as I am aware these have all had the disadvantage that the resultant product is weak and brittle.

In the accompanying drawings I have illustrated in diagram a machine upon which my process can be carried out.

I first mix the hydraulic cement, asbestos fibre and water in a beating engine in the usual manner, retaining, or even exceeding, the usual proportions of hydraulic cement and asbestos, until the cement is thoroughly "colloided", or rendered sticky and gluelike, and entangled with the fibrous material. An example of proportions is 85% by weight of hydraulic cement and 15% of asbestos fibre. The mixture is then flowed into a vat 1, in which revolves a screen roller 2 which in revolving picks up and deposits upon the endless felt belt 3 a film of the wet hydraulic cement and asbestos fibre. A suction box 4 removes surplus water from the mixture. Into a hopper 5 is placed finely ground material, such as ground scrap of the original material, i. e. set and hardened hydraulic cement and asbestos fibre in the above given proportions, or other material of similar character. If preferred more or less finely divided sand may be mixed with the material. A wire covered roller 6 feeds the dry mixture to the lower hopper 7 where it is picked up by a revolving brush 8, from which it is scraped by a scraper 9, and passing over the apron 10 the dry powdered material falls and sprinkles evenly upon the film of wet material on the belt. Various proportions of the dry material with respect to the wet material may be used according to conditions. It may under the conditions stated rise as high as 30% of the weight of the wet mixture without detriment to the strength of the product. The film of combined material passes under the cylinder 11, where it is transferred to the surface of the latter and winds up thereon in layers. When the layers build up to the desired thickness the sheet is removed from the cylinder and subjected to hydraulic pressure and the cement allowed to set. Sufficient pressure to form the sheet is imparted to the cylinder 11 by its weight and by the weight 12 acting through the lever 13, connecting rod 14, lever 15 and bearing rod 16. Other rolls 17 and 18 may be employed to aid in maintaining the shape of the sheet before it has been subjected to the final high pressure. The belt is cleaned by sprayers 19 and beater 20.

I claim:—

1. The process which consists in first working up hydraulic cement, fibrous material and water until the cement has become sticky and entangled with fibre, then forming the wet mixture in a sheet, then sprinkling the sheet with finely divided material, then building up said sheet into a plurality of thicknesses, then subjecting the mixture to pressure, and then allowing the hydraulic cement to set.

2. The process which consists in first working up hydraulic cement, fibrous material and water until the cement has become sticky and entangled with fibre, then forming the wet mixture in a sheet, then sprinkling the sheet with finely divided material containing finely divided silica, then building up said sheet into a plurality of thicknesses, then subjecting the mixture to pressure, and then allowing the hydraulic cement to set.

3. The process which consists in first working up hydraulic cement, fibrous material and water until the cement has become sticky and entangled with fibre, then forming the wet mixture in a sheet, then sprinkling the sheet with finely divided material comprising finely divided hydraulic cement, fibrous material and silica, then subjecting the mixture to pressure, and then allowing the hydraulic cement to set.

4. The process which consists in first working up hydraulic cement, fibrous material and water until the cement has become sticky and entangled with fibre, then forming the wet mixture in a sheet, then sprinkling the sheet with finely divided inert material in the proportion of approximately one-third inert material to two-thirds wet mixture, then building up said sheet into a plurality of thicknesses, then subjecting the mixture to pressure, and then allowing the hydraulic cement to set.

5. The process which consists in first working up hydraulic cement, fibrous material and water until the cement has become sticky and entangled with fibre, then forming the wet mixture in a sheet, then sprinkling the sheet with finely divided inert material, building up the said sheet in layers, subjecting the mass to pressure, and then allowing the hydraulic cement to set.

6. A product comprising a series of layers of hydraulic cement entangled with fibrous material and alternating with a series of layers of finely divided inert material, the whole being subjected to pressure before the hydraulic cement is set.

JOHN W. LEDEBOER.